(12) United States Patent
Assmann (10) Patent No.: US 9,751,432 B2
(45) Date of Patent: Sep. 5, 2017

(54) FITTING SYSTEM FOR A VEHICLE SEAT AND VEHICLE SEAT

(71) Applicant: JOHNSON CONTROLS COMPONENTS GMBH & CO. KG, Kaiserslautern (DE)

(72) Inventor: Uwe Assmann, Remscheid (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 1 day.

(21) Appl. No.: 14/782,144

(22) PCT Filed: Apr. 1, 2014

(86) PCT No.: PCT/EP2014/056521
§ 371 (c)(1),
(2) Date: Oct. 2, 2015

(87) PCT Pub. No.: WO2014/161851
PCT Pub. Date: Oct. 9, 2014

(65) Prior Publication Data
US 2016/0046211 A1    Feb. 18, 2016

(30) Foreign Application Priority Data

Apr. 5, 2013  (DE) .................. 10 2013 206 096
Jun. 7, 2013  (DE) .................. 10 2013 210 688

(51) Int. Cl.
*B60N 2/22*     (2006.01)
*B60N 2/235*    (2006.01)

(52) U.S. Cl.
CPC ............. *B60N 2/2227* (2013.01); *B60N 2/22* (2013.01); *B60N 2/2356* (2013.01)

(58) Field of Classification Search
CPC ....... B60N 2/2227; B60N 2/2356; B60N 2/22
(Continued)

(56) References Cited

U.S. PATENT DOCUMENTS 6,799,806 B2    10/2004  Eppert et al.
9,022,477 B2 *   5/2015  Pleskot ................... B60N 2/06
                                                    297/463.1 X
(Continued)

FOREIGN PATENT DOCUMENTS

DE          699 06 559 T2    4/2004
DE    10 2005 046 807 B3    11/2006
(Continued)

*Primary Examiner* — Anthony D Barfield
(74) *Attorney, Agent, or Firm* — McGlew and Tuttle, P.C.

(57) ABSTRACT

A vehicle seat fitting system includes a fitting (10) with a first and second fitting part (11, 12) to lock and rotate about an axis (A), a transfer rod which unlocks the fitting and a hand lever (5), which rotates the transfer rod to unlock the fitting. A stop module (50) is supported on the fitting to rotate about the axis and stop the hand lever and one of the fitting parts in relation to each other in a one rotational direction. The stop module has a stop (50b) and the one fitting part has a counter stop (51) that define a rotational angular range. A restoring spring (54) with spring ends (54b, 54c) preloads the stop (50b) in the direction of the counter stop. One of the spring ends is fastened to a spring mount (3b) arranged outside of the stop module in a radial direction.

20 Claims, 6 Drawing Sheets

(58) Field of Classification Search
USPC .................................................... 297/463.1
See application file for complete search history.

(56) References Cited

U.S. PATENT DOCUMENTS

2012/0228915 A1    9/2012  Holzhueter et al.
2012/0242133 A1*   9/2012  Jaudouin .............. B60N 2/2356
                                                       297/463.1 X

FOREIGN PATENT DOCUMENTS

| DE | 10 2006 015 560 B3 | 8/2007 |
| DE | 10 2008 045349 A1 | 3/2010 |
| DE | 10 2012 006 227 A1 | 1/2013 |
| DE | 10 2012 023 057 A1 | 4/2014 |
| WO | 2004/103764 A1 | 12/2004 |
| WO | 2005/016685 A1 | 2/2005 |
| WO | 2011/160771 A1 | 12/2011 |

* cited by examiner

FITTING SYSTEM FOR A VEHICLE SEAT AND VEHICLE SEAT

CROSS REFERENCE TO RELATED APPLICATIONS

This application is a United States National Phase Application of International Application PCT/EP2014/056521 filed Apr. 1, 2014 and claims the benefit of priority under 35 U.S.C. §119 of German Patent Applications 10 2013 206 096.3 filed Apr. 5, 2013 and 10 2013 210 688.2 filed Jun. 7, 2013 the entire contents of which are incorporated herein by reference.

FIELD OF THE INVENTION

The invention relates to a fitting system for a vehicle seat with at least one fitting which has a first fitting part and a second fitting part, which are lockable to each other and are rotatable relative to each other about an axis, a transmission rod, the rotation of which unlocks the fitting, a hand lever, the actuation of which at least indirectly rotates the transmission rod in order to unlock the fitting, a stop module which is mounted on the fitting so as to be rotatable about the axis, is formed separately from the hand lever and on the one hand is functionally connected to the hand lever and on the other hand is functionally connected to the transmission rod, and which brings the hand lever and one of the fitting parts into relative abutment in at least one rotational direction, wherein the stop module has at least one stop and one of the fitting parts has at least one counterstop, which stop and counterstop interact in the circumferential direction of the axis and define an angular range, within which the stop module is rotatable relative to the one fitting part and a return spring that pretensions the stop in the direction of the counterstop and to a vehicle seat.

BACKGROUND OF THE INVENTION

A fitting system of this type is known from WO 2011/160771 A1. A special return spring holds the stop module in an abutment position with respect to the fitting. The return spring has a first and a second spring end, which both, as seen in the radial direction, do not project beyond the outer contour of the stop module, and therefore the spring ends are not visible during the installation of the stop module on the fitting. This makes it difficult to insert the first spring end into a holder of the fitting. The second spring end is hooked into one of eight holes. Due to the plurality of holes, the second spring end may be inadvertently hooked into a hole not provided therefor. In addition, the insertion of the second spring end in one of the holes requires precise positioning of the second spring end over the corresponding hole.

DE 10 2012 006 227 A1 discloses a fitting system for a vehicle seat, which fitting system comprises two stop modules. A first stop module is integrally formed on a first operating element which is fitted on a left outer side of the seat. A second stop module is integrally formed on a second operating element which is fitted on a right outer side of the seat. The first operating element and the second operating element significantly differ in shape from each other, and therefore it is not possible for transpositions to occur when installing the operating elements on the vehicle seat.

WO 2005 016 685 A1 discloses a fitting for a vehicle seat, in particular for a motor vehicle seat, with a first fitting part, a second fitting part which is rotatable relative thereto and is lockable, and a profiled shaft, the actuation of which unlocks the fitting, wherein a spring pretensions the shaft counter to the actuating direction and the spring at the same time secures the shaft in relation to the fitting in the axial direction of the shaft.

SUMMARY OF THE INVENTION

The invention is based on an object of improving a fitting system of the type mentioned at the beginning, in particular of facilitating the installation of the stop module on the fitting and of avoiding unintentional installation errors. In addition, a vehicle seat which can be fitted in a simple manner and with little probability of error is intended to be provided.

According to the invention, a vehicle seat fitting system is provided comprising at least one fitting comprising a first fitting part and a second fitting part, which are lockable to each other and are rotatable relative to each other about an axis, a transmission rod, the rotation of which unlocks the fitting, a hand lever, the actuation of which at least indirectly rotates the transmission rod in order to unlock the fitting a stop module, a return spring and a spring holder. The stop module is mounted on the fitting so as to be rotatable about the axis, and is formed separately from the hand lever and on the one hand is functionally connected to the hand lever and on the other hand is functionally connected to the transmission rod. The stop module brings the hand lever and one of the fitting parts into relative abutment in at least one rotational direction. The stop module has at least one stop and one of the first fitting part and the second fitting part has at least one counterstop, which stop and counterstop interact in the circumferential direction of the axis and define an angular range, within which the stop module is rotatable relative to the one fitting part. The return spring has a first spring end and a second spring end. The return spring pretensions the stop in the direction of the counterstop in one rotational direction of the stop module. The spring holder is a part of the fitting system or the vehicle seat. One of the two spring ends is fastened to the spring holder of the fitting system or of the vehicle seat and the spring holder is arranged outside the stop module in a radial direction.

Owing to the fact that one of the two spring ends is fastenable to, in particular hooked into, a spring holder arranged outside the stop module in the radial direction, said spring end is visible during the installation of the stop module on the fitting or on the vehicle seat and is reachable for precise manual positioning.

The spring end arranged outside the stop module is preferably fastened to a spring holder of a seat section adapter of the seat section, in particular is inserted or hooked into said spring holder. Cost-effective and easily fittable fastening of the spring can thereby be provided.

The stop module is formed separately from the hand lever. The hand lever can therefore be connected to the stop module during the installation sequence following the fastening of the spring end to the spring holder of the seat section adapter. It is thereby possible to check the correct installation of the spring before the hand lever is connected to the stop module and possibly conceals the view of the spring end. If different operating elements, for example of differing shape and/or differing color, are used for different vehicle seats, the same stop modules can always be used because of the separate formation of hand lever and stop module. Only the operating elements themselves have to be configured individually, which reduces costs, in particular tool costs.

Axial securing of the spring end in a hole-shaped spring holder can be effectively achieved by the spring end enclosing a small angle of preferably 2° to 15° with a parallel to the rotational axis of the fitting.

The stop module contains only precisely one hole for the hooking in of the other of the two spring ends, and therefore hooking into a hole not provided for this purpose is avoided. An in particular peripheral rounding of a transition region between the cylindrical wall of said hole and a bottom of the housing of the stop module facilitates the insertion of the other of the two spring ends and avoids a collision with the bending radius of the return spring.

The stop module preferably has an approximately cup-shaped basic body with a substantially cylindrical wall and a bottom which closes the cylinder formed by the cylindrical wall. Said cup-shaped basic body provides a protected housing for the return spring. The stop module is designed as an identical part and can therefore be used on the left side and the right side of the vehicle seat. The return spring for the left seat side is mirror-symmetrical with respect to a return spring for the right seat side.

The stop module comprises a first marking and a second marking. In the fitted state on the left seat side, a spring leg of the return spring is aligned with the first marking in the event of a correct pairing of a left return spring with the stop module. On the right seat side, the spring leg is aligned with the second marking in the event of a correct pairing of a right return spring with the stop module. When an incorrect (mirror-symmetrical) spring is used, the spring leg does not align with the corresponding marking.

The fitting system according to the invention comprises at least one fitting, a transmission rod, a hand lever, a stop module, a return spring and optionally a backrest compensation spring. The fitting system preferably additionally comprises a seat section adapter which, however, may also be part of the rest of the vehicle seat.

The stop module which on the one hand is functionally connected to the hand lever and on the other hand is functionally connected to the transmission rod and which brings the hand lever and one of the fitting parts into relative abutment in at least one rotational direction fulfills a plurality of functions.

The first function, which results from the functional connection, is the transmission of torque from the hand lever to the transmission rod, which transmits the torque into the fittings when the hand lever is pivoted into the unlocking direction. The transmission of the torque is preferably limited to a defined angular range, and therefore the hand lever is pivotable only between a starting position and a maximum deflection.

The first function is a precondition for the second function, specifically safeguarding against misuse, in which the transmission of torque is interrupted by the hand lever and one of the fitting parts being brought into relative abutment so that the torque is applied to the said fitting part, that is to say is ineffective. As a result, the internal components of the fitting are protected. This is especially important for rotation in the locking direction because the internal components of the fitting then already occupy their end position and further force action by the transmission rod would directly lead to damage. The second function of the stop module as a safeguard against misuse can also however be extended to the extent that the stop module also becomes effective if the fitting is unlocked and the transmission rod is further rotated into the unlocking direction. The stop module then limits the angular range for the operation of the hand lever.

A third function is the de-rattling by the stop module being held in abutment against the fitting by means of the return spring, which (under the pretensioning of the return spring) prevents a relative movement of the transmission rod which is functionally connected to the stop module. In order to constructionally accommodate the return spring, the stop module is preferably of cup-shaped design. The definition of the end position of the hand lever can be seen as a fourth function of the stop module.

For the first function which is effective in the circumferential direction, preferably rotation-resistant connections between hand lever and stop module and between stop module and transmission rod are provided, for example correspondingly profiled holders, openings, ribs or grooves. For the second function, which is also effective in the circumferential direction, the stops and counterstops are formed in a preferably axially projecting manner, with corresponding extensions in the radial direction in order to form large stop faces in the circumferential direction. The counterstops are preferably formed on the associated fitting part, i.e. formed in one piece with this, but can alternatively also be produced separately and be fastened on the fitting part.

For axial locking between hand lever and stop module and also between stop module and the other components of the stop, locking lugs and locking openings and/or clip-in hooks and rings or annular beads can be provided. Rotation-resistant connections and axial locking devices can exist in an encompassing manner between different elements of the functional connection. For example, for the stop module and the transmission rod of strand-shaped profile it is practical to use the next element for axial locking, specifically the driver—which is to be rotated by the transmission rod—inside the fitting by this being provided with a fastening ring, for example, which is preferably welded on.

The fitting system according to the invention is used in vehicle seats preferably for adjusting the backrest inclination but can also be used in other places. A construction of the fitting as a disk-like unit enables any angle changes between the fitting parts by means of the relative rotation around the axis. The axial holding together of the fitting parts is created by means of a clamp ring which fits over the first fitting part, which is movable relative to it, radially on the outside by means of a radially inwardly bent edge and which is fixedly connected to the second fitting part. The term clamp ring should also be understood as meaning simply shaped holding rings which are substantially disk-shaped and have a substantially flat ring shape, as is disclosed, for example, in subsequently published DE 10 2012 023 057.

The invention is explained in more detail below with reference to an advantageous exemplary embodiment, which is illustrated in the figures. However, the invention is not restricted to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
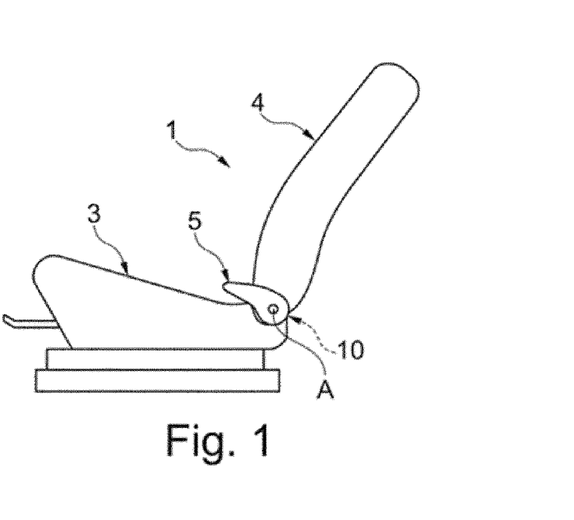
FIG. 1 is a schematic illustration of a vehicle seat.

A vehicle seat 1 for a motor vehicle has a seat section 3 and a backrest 4 which is adjustable in its inclination relative to the seat section 3. For inclination adjustment of the backrest 4, a transmission rod 7, which is arranged horizontally in the transition region between seat section 3 and backrest 4, is rotated manually, for example by means of a hand lever 5. The transmission rod 7 engages in a respective fitting 10 on both sides of the vehicle seat 1. The transmission rod 7 defines the applied direction details of a cylindrical coordinate system, in particular the radial and the axial direction.

Figure 14:
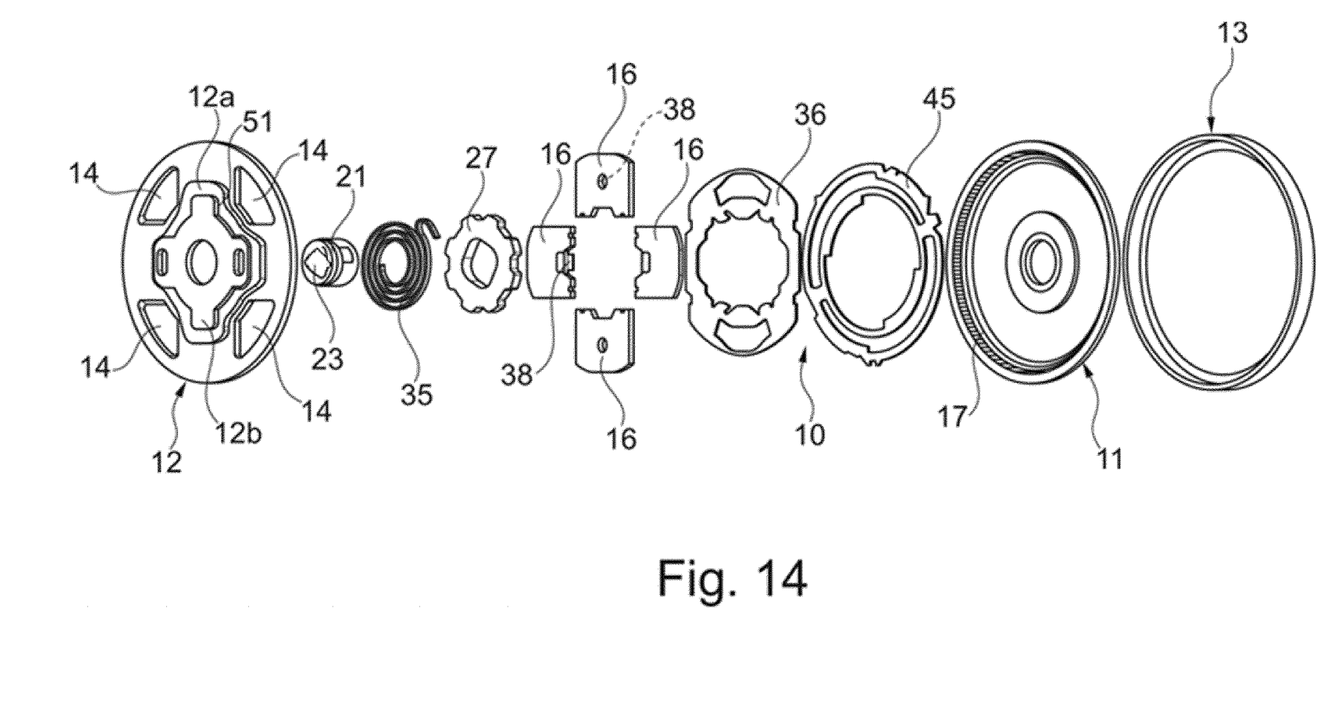
FIG. 14 is an exploded perspective illustration of a fitting.

The fitting 10 is designed as a locking fitting in which a first fitting part 11 and a second fitting part 12 are lockable to each other and, after being unlocked, are rotatable relative to each other about an axis A (aligned with the transmission rod 7), as described, for example, in DE 10 2006 015 560 B3.

The two fitting parts 11 and 12 can be inscribed in each case approximately in a circular disk shape. For absorbing the axially acting forces, that is to say for holding the fitting parts 11 and 12 together, provision is made of a clamp ring 13. Such holding together by means of a clamp ring is described in U.S. Pat. No. 6,799,806 B2, for example. The preferably metal clamp ring 13 is fixedly connected to one of the two fitting parts 11 and 12, for example to the second fitting part 12, preferably welded thereto, or—by it fitting over the fitting part connected to it—being flanged thereto. On one end face, the clamp ring 13 has a radially inwardly bent edge by means of which—possibly with the optional interposition of a separate slide ring—it fits radially on the outside over the other of the two fitting parts 11 and 12, for example the first fitting part 11, without hindering the relative movement of the two fitting parts 11 and 12. With regard to construction, the two fitting parts 11 and 12 together (with the clamp ring 13) therefore form a disk-like unit. In a modification of the exemplary embodiment, the clamp ring 13 is a simply shaped holding ring which is substantially disk-shaped and has a substantially flat ring shape, as disclosed, for example, in subsequently published DE 10 2012 023 057.

Figure 3:
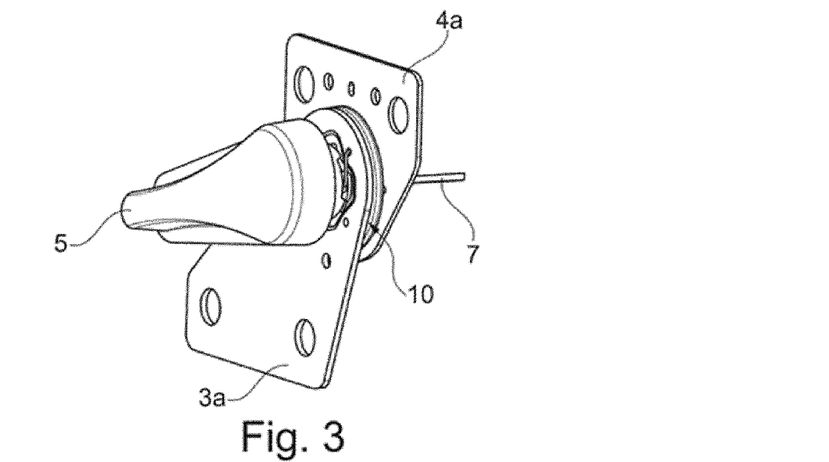
FIG. 3 is a perspective partial view of the fitting system, fitted on a seat section adapter and on a backrest adapter.

After installing the fitting 10, the first fitting part 11 is connected—for example fixedly—to the structure of the backrest 4, in the present case to a backrest adapter 4a, that is to say in a manner fixed to the backrest. The second fitting part 12 is then fixedly connected to the structure of the seat section 3, in the present case to a seat section adapter 3a, that is to say in a manner fixed to the seat section. The allocations of the fitting parts 11 and 12, however, can also be reversed, i.e. the first fitting part 11 would then be fixed to the seat section and the second fitting part 12 would be fixed to the backrest.

The second fitting part 12 has guide segments 14—of which there are four in the present case—which by straight guiding surfaces guide a latch 16 in pairs in each case laterally in the radial direction. The latches 16—of which there are altogether four in the present case—are arranged in an installation space defined between the two fitting parts 11 and 12 in an offset manner in relation to each other—by 90° each in the present case. The latches 16, on their radially outer end, are provided with a toothing arrangement which can mesh (engage) with a toothed ring 17 of the first fitting part 11 which is formed as an internal gear ring. When the toothed ring 17 and the latches 16 interact, the fitting 10 is locked. The guide segments 14, by a curved bearing face in each case, butt against the toothed ring 17 of the first fitting part 11, as a result of which the two fitting parts 11 and 12 are positioned one inside the other.

Alternatively, the first fitting part 11 is arranged in a depression of the second fitting part 12 and is overlapped radially on the outside by the latter, as a result of which the two fitting parts 11 and 12 are positioned one inside the other. The radially outer edge region of the first fitting part 11 with the toothed ring 17 is arranged in the radial direction between the guide segments 14 and the radially outer edge region (serving for the mounting of the first fitting part 11) of the second fitting part 12. In the event of high loads, for example in the event of a crash, the first fitting part 11—after deformation—can come with the toothed ring 17 thereof into abutment against the bearing surfaces of the guide segments 14 positioned closer in the load direction. This increases the strength of the fitting 10.

Arranged in the center of the fitting 10 is a driver 21, for example consisting of plastic, which is rotatably mounted on at least one of the two fitting parts 11 and 12, in both fitting parts 11 and 12 in the present case, more precisely in a central opening thereof. On both sides of the vehicle seat, the driver 21 is connected in a rotation-resistant manner or is at least coupled by entrainment to the transmission rod 7, which is inserted into a hole 23 in the hollow driver 21. In the axial direction, the driver 21 is of greater diameter in the middle than on its ends supported in the fitting parts 11 and 12 so that the two fitting parts 11 and 12 axially lock the driver 21. A fastening ring 24 which in the present case consists of plastic and is fastened to the driver 21 preferably by means of ultrasonic welding is provided on one end of the driver 21, in the present case the end on the second fitting part 12.

An eccentric 27, which is arranged in the installation space defined between the fitting parts 11 and 12, is seated in a rotation-resistant manner on the driver 21 or at least coupled by entrainment. A spring arrangement 35, being a helical spring in the present case, is arranged in a central holder of one of the two fitting parts 11 and 12—of the second fitting part 12 in the present case—and is supported on the outside in the present case. The spring arrangement 35 acts upon the eccentric 27, in the present case by it being seated on the driver 21 in a rotation-resistant manner inside. An alternative spring arrangement 35 with two nested helical springs is described in DE 10 2005 046 807 B3, for example. The eccentric 27, which is acted upon by the spring arrangement 35, influences the radially movable latches 16 and acts upon these so that they are pressed radially outwards in order to engage in the toothed ring 17, whereby the fitting 10 is locked.

A control disk 36 is arranged in the installation space axially between the latches 16 and the first fitting part 11 and in the present case is seated on the eccentric 27 in a rotation-resistant manner. The control disk 36 has control tracks—of which there are four in the present case—which interact with a lug 38 of each latch 16 in each case. The lugs 38 in this case project in the axial direction from the latches 16 which are associated with them. With a rotation (by several degrees) of the driver 21—and of the eccentric 27 driven by it and of the control disk 36—against the force of the spring arrangement 35, the control disk 16 draws the latches 36 radially inwards, i.e. from the toothed ring 17, whereby the fitting 10 is unlocked and the two fitting parts 11 and 12 can be rotated relative to each other around the axis A. The inclination of the backrest 4 is consequently adjustable between a plurality of in-use positions which are suitable for use of the seat.

In the case of two-door motor vehicles, the access to a rear seat row is to be made easier by means of a free pivoting of the backrest 4, for which the unlocked backrest 4 is pivoted from one of the in-use position forwards into a freely pivoted position which is not suitable for use of the seat. It increases the operating comfort if the hand lever 5—or another operating element—does not have to be held during the entire free pivoting and if the fittings despite this lock only in the freely pivoted position. For this, provision is optionally made in the fitting 10, between the control disk 36 and the first fitting part 11, of a ring-like free-pivoting control element 45 around the axis A, which is connected in a rotation-resistant manner to the first fitting part 11. The free-pivoting control element 45 has stop tracks which interact with the lugs 38 of the latches 16 by them radially outwardly limiting their movement or allowing these to engage without hindrance. In order to be able to freely pivot the backrest 4 over more than the angle between two latches 16, the lugs 38 of the latches 16 are arranged on the latches 16 associated with them at alternately different distances radially outwards or radially inwards so that adjacent lugs 38 interact with different stop tracks. Accordingly, two different designs of the latches 16 are provided. Details are described in DE 10 2006 015 560 B3.

Figure 2:
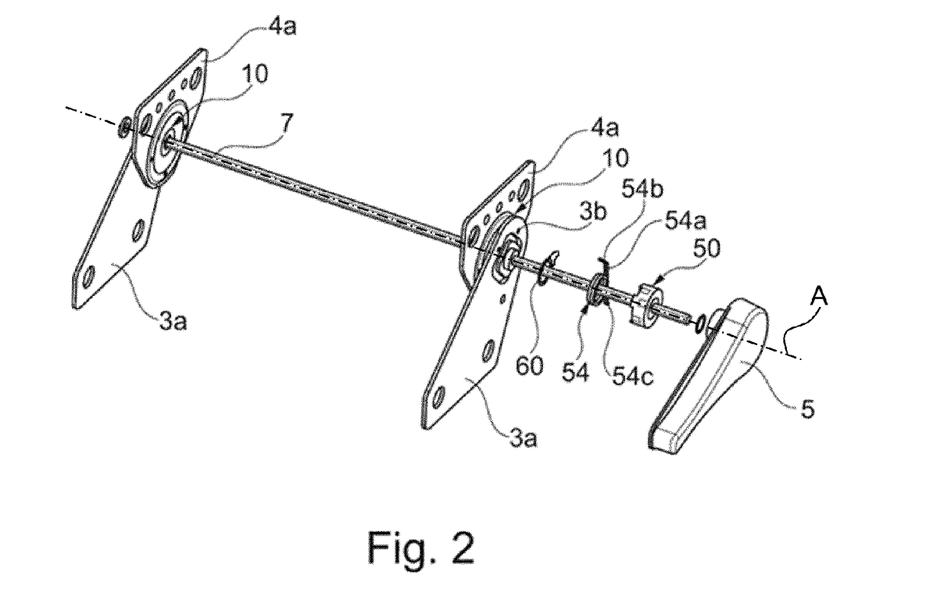
FIG. 2 is an illustration of the fitting system in a partial exploded illustration.

The two fittings 10, the transmission rod 7 and the hand lever 5 are parts of a fitting system, with which is optionally also associated at least one backrest compensation spring which can be arranged on one of the two fittings 10. In the present exemplary embodiment, a backrest compensation spring is not provided.

Provision can also be made of a backrest compensation spring on each of the two fittings 10. The backrest compensation spring is produced from a spring steel strip with approximately rectangular cross section and is formed as a helical spring.

The inner end of the backrest compensation spring is supported on the associated fitting 10. To this end, the fitting 10 has a support bush which is fastened on one of the two fitting parts 11 or 12 and aligns with the axis A. The support bush preferably consists of metal, in particular steel. The fastening is carried out preferably by means of laser welding. To this end, the support bush is seated with its ring-like end face on the concerned fitting part 11 or 12 and then welded to this. The backrest compensation spring then bears with its innermost winding on the cylindrical outer side of the support bush and is hooked by its end into a slot of the support bush, for example.

The outer end of the backrest compensation spring is supported on a support element, so that it acts upon the backrest 4 on account of its pretension. The support element can be, for example, an axially projecting bolt, an axially extended tab or an axial protrusion of a support ring. In the present case, the support element is fastened to the backrest adapter 4a from which it projects axially. The pretension is selected so that the backrest compensation spring in the possible in-use positions of the backrest 4 at least partially compensates the weight of the backrest 4.

Two possibilities exist where the support bush is fastened on the fitting 10. The support bush can be fastened in a first variant on the first fitting part 11, which in the present case is fixed on the backrest. Or, the support bush is fastened in a modified second variant on the second fitting part 12, which in the present case is fixed on the seat section. Accordingly, the bolt or support ring or the like, which is provided for the supporting of the outer end of the backrest compensation spring, is fixedly connected in the first variant to the seat section 3, for example welded thereto, if the support bush is fastened on the first fitting part 11 which is fixed on the backrest. In the second variant, the support ring or other support, which is provided for supporting the outer end of the backrest compensation spring, is fixedly connected to the backrest 4, for example welded thereto, if the support bush is fastened on the second fitting part 12 which is fixed on the seat section.

Figure 4:
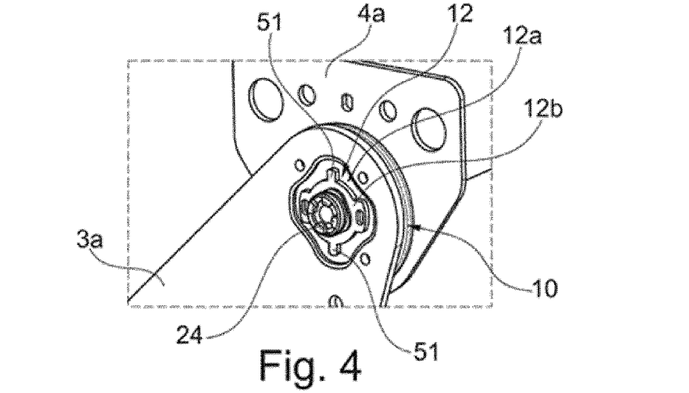
FIG. 4 is a view corresponding to FIG. 3 without hand lever, stop module, transmission rod and return spring.
Figure 5:
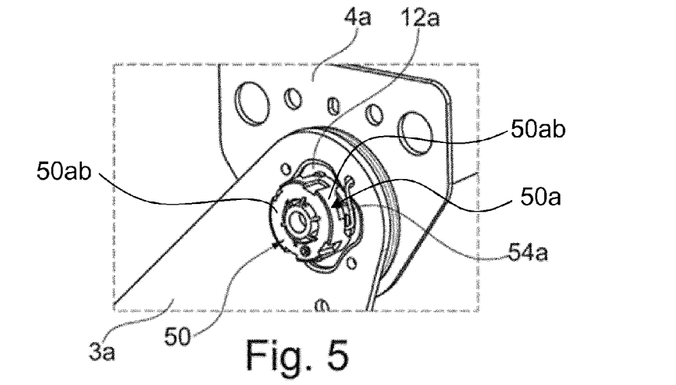
FIG. 5 is a view corresponding to FIG. 3 without hand lever and transmission rod.
Figure 6:
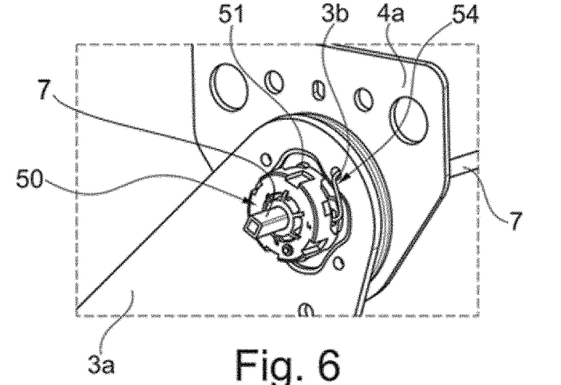
FIG. 6 is a view corresponding to FIG. 3 without hand lever and without securing disk of the transmission rod.

The second fitting part 12, on its outer side (that is to say on the side facing away from the first fitting part 11), has a first star-shaped shoulder 12a, of which four (in the present case) rays or arms are arranged between the four (in the present case) guide segments 14. Arranged on this first star-shaped shoulder 12a is a second star-shaped shoulder 12b of smaller dimensions than the first star-shaped shoulder 12a. In this way, a terrace-like construction is created, being formed in the present case on account of the embossing of the second fitting part 12. The first star-shaped shoulder 12a serves for fastening the fitting 10 on the structure—on the seat section adapter 3a fixed on the seat section in the present case—by the first star-shaped shoulder 12a being inserted into a matching opening in the seat section adapter 3a and being fixedly connected to this, preferably laser welded thereto. The second star-shaped shoulder 12b, on its side facing the interior of the fitting 10, provides installation space for the spring arrangement 35.

The second star-shaped shoulder 12b projects through the opening in the seat section adapter 3a and axially protrudes on the other side of the structure. In the first variant, the outer side of the second fitting part 12 faces away from the support bush and therefore away from the backrest compensation spring. In the second variant, the support bush is arranged in an axially projecting manner on the second star-shaped shoulder 12*b* and is fixedly connected there to the second fitting part 12, preferably welded thereto. That end side of the support bush which faces the second fitting part 12 can here have battlement-like protrusions which interact preferably in a form-fitting manner with the second star-shaped shoulder 12*b* and thus preposition the support bush.

Between the hand lever 5 and the fitting 10 which is adjacent to it, that is to say only on one side of the vehicle seat, provision is made of a stop module 50. The stop module 50 has a cup-shaped basic body 50*a* and is preferably designed as an injection-molded plastic part. The cup-shaped basic body 50*a* essentially comprises a cylindrical wall 50*aa* and a bottom 50*ab* closing the cylinder formed therefrom.

The stop module 50, with its open side, faces the second fitting part 12. The cylinder axis of the wall 50*aa* aligns with the axis A. On the open side of the stop module 50, the edge of the cylindrical wall 50*aa* of the stop module 50 is formed like a crown by a plurality of integrally formed stops 50*b*—of which there are four in the present case (i.e. formed in one piece with the stop module 50) axially projecting along the edge. Axially projecting from the inside of the stop module 50 are a plurality of clip-in hooks 50*c*—of which there are six in the present case and which are in particular integrally formed on the bottom 50*ab* and are arranged concentrically to the stops 50*b*. The clip-in hooks 50*c* fit behind the fastening ring 24 of the driver 21 in the axial direction, forming a clip-in connection, as a result of which the stop module 50 is rotatably connected to the fitting 10 (on its outer side), but secured in a form-fitting manner in the axial direction.

Four rays or arms of the second star-shaped shoulder 12*b* define four counterstops 51 which are suitable for interacting with the stops 50*b* of the stop module 50 in the circumferential direction.

Figure 9:
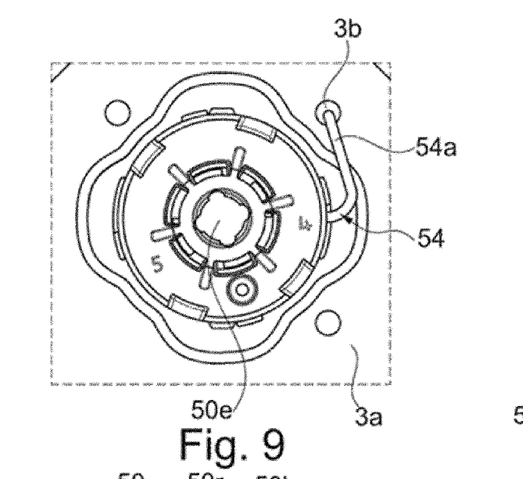
FIG. 9 is a view in the axial direction of the fitting system without hand lever and transmission rod.
Figure 10:
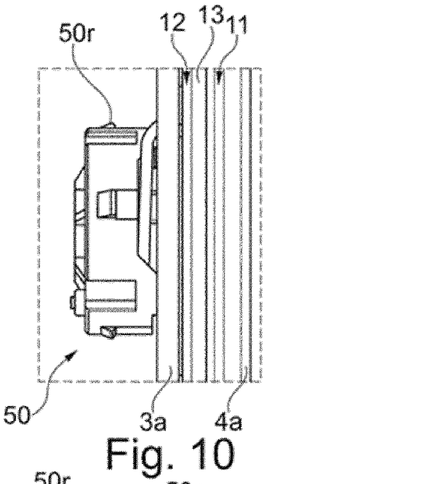
FIG. 10 is a view in the radial direction of the fitting system without hand lever and transmission rod.
Figure 11A:
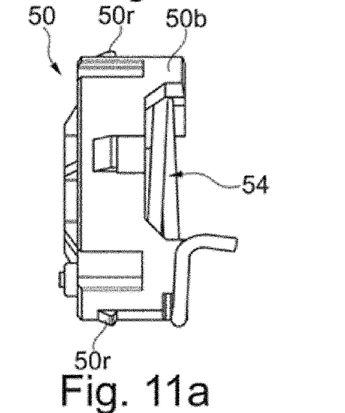
FIG. 11a is a side view showing the stop module with return spring prefitted, but not yet tensioned.
Figure 11B:
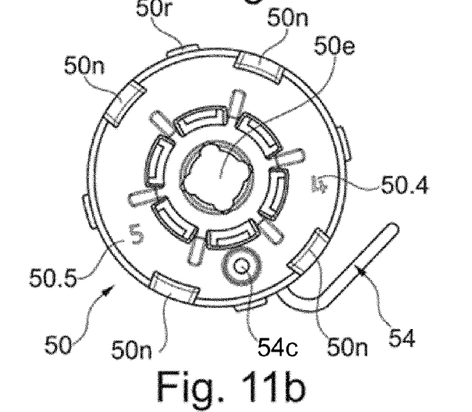
FIG. 11b is a front view showing the stop module with return spring prefitted, but not yet tensioned.
Figure 11C:
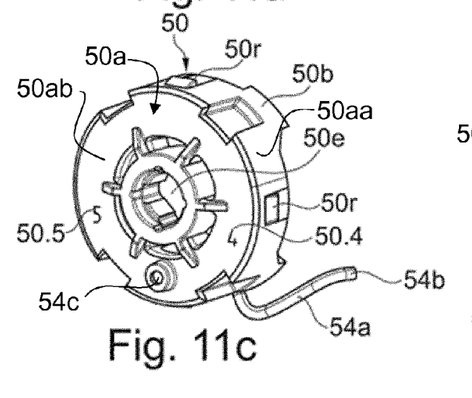
FIG. 11c is a front perspective view showing the stop module with return spring prefitted, but not yet tensioned.
Figure 11D:
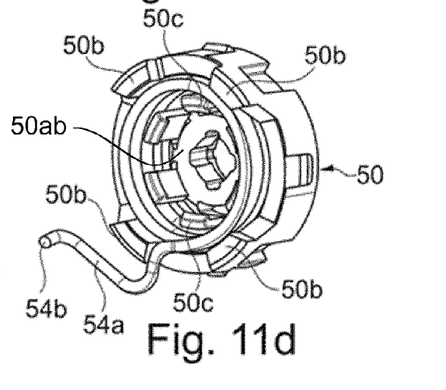
FIG. 11d is a rear perspective view showing the stop module with return spring prefitted, but not yet tensioned.
Figure 12A:
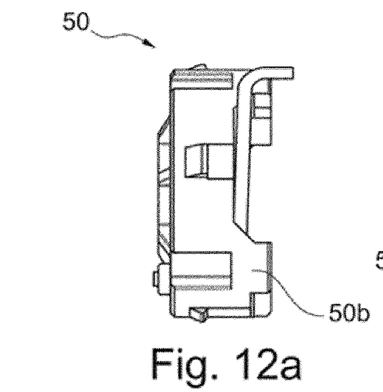
FIG. 12a is a side view showing the stop module with prefitted and tensioned return spring.
Figure 12B:
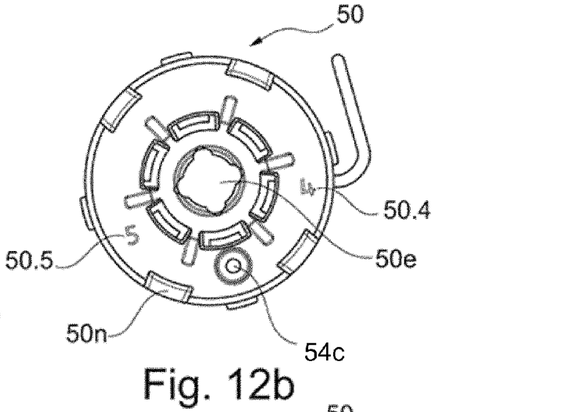
FIG. 12b is a front view showing the stop module with prefitted and tensioned return spring.
Figures 12C, 12D:
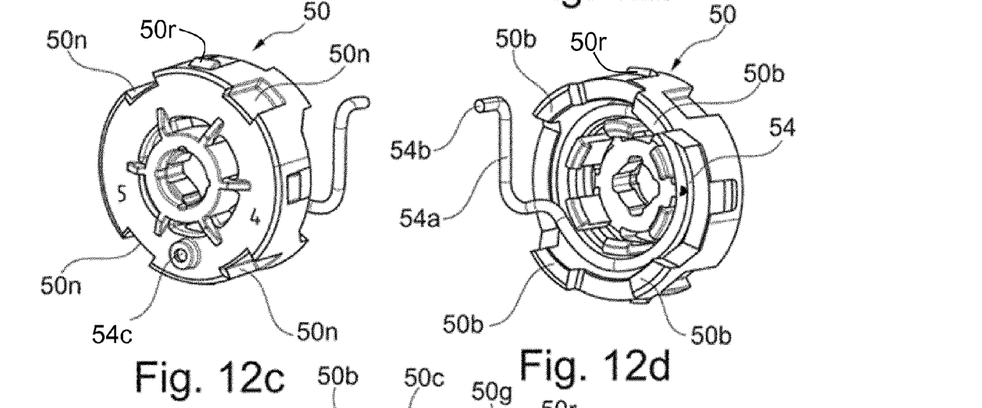
FIG. 12c is a front perspective view showing the stop module with prefitted and tensioned return spring.
FIG. 12d is a rear perspective view showing the stop module with prefitted and tensioned return spring.

When the stop module 50 is connected to the driver 21, that is to say is clipped in in the present case, the four stops 50*b* are arranged with a lot of clearance in the circumferential direction, for example 30°, between the counterstops 51. The stops 50*b* preferably butt with their axial end faces against the first star-shaped shoulder 12*a* (or against the free end face of the support bush).

A return spring 54 is arranged inside the stop module 50 in the radial direction between the wall 50*aa* and the clip-in hooks 50*c*. The return spring 54 is preferably helically wound from spring wire and comprises a first spring end 54*b* and a second spring end 54*c*. The two spring ends 54*b*, 54*c* are bent around and axially project (in approximately the opposite direction) from the helical basic body of the return spring 54.

A spring leg 54*a* is located between the helical basic body of the return spring 54 and the first spring end 54*b*. The spring leg 54*a* initially runs outward in a S-shaped manner from the basic body of the return spring 54 and subsequently linearly, substantially tangentially and offset radially with respect to the helical basic body of the return spring 54. The spring leg 54*a* connects the helical basic body of the return spring 54 to the first spring end 54*b*. In the present case, the helical basic body of the return spring 54, the spring leg 54*a*, the first spring end 54*b* and the second spring end 54*c* are bent from a single spring wire.

Figure 8:
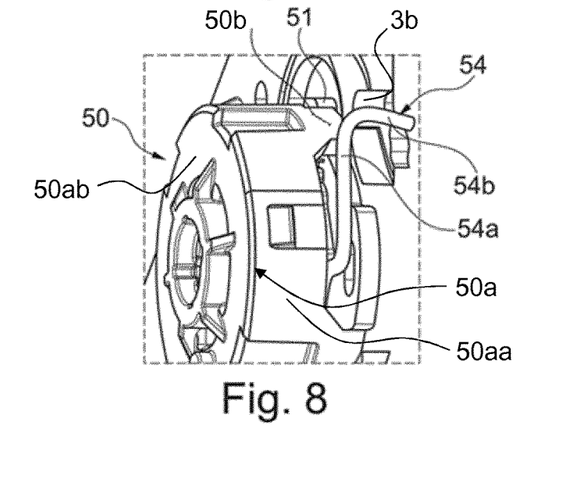
FIG. 8 is a perspective view of a partial region of the fitting system with seat section adapter illustrated in sectional form.

The seat section adapter 3*a* comprises a spring holder 3*b* which, in the present case, is designed as a hole and serves for the hooking-in (i.e. the fastening) of the first spring end 54*b* of the return spring 54.

In the present case, the first spring end 54*b* is inclined slightly, preferably by 2° to 15°, in relation to a parallel to the axis A such that the first spring end 54*b* can interact in the axial direction with the spring holder 3*b* in such a manner that the first spring end 54*b* is secured in a form-fitting manner in the axial direction.

Figure 13:
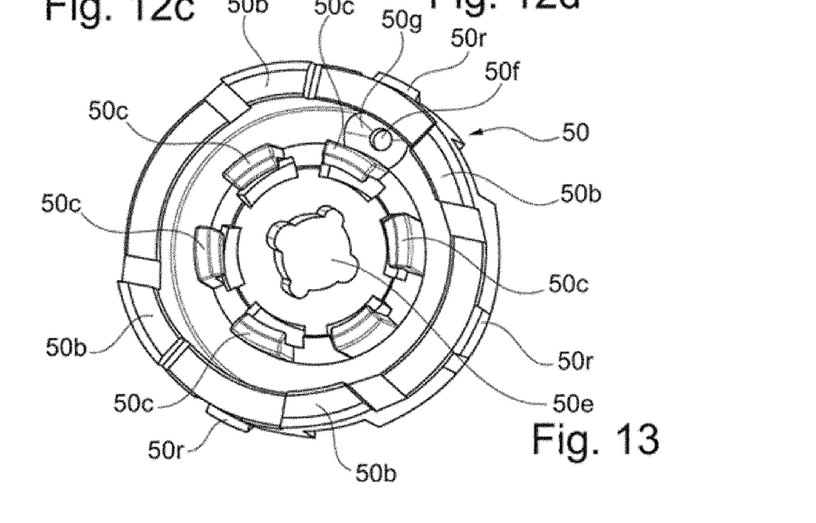
FIG. 13 is a view corresponding to FIG. 11d without return spring.

In the bottom 50*ab* of the stop module 50, that is to say of its largely closed end face, provision is made of a central opening 50*e* which is formed straight through in the axial direction and which is arranged concentrically to the cylindrical wall 50*aa* having the stops 50*b* and concentrically to the clip-in hooks 50*c*. The profiled central opening 50*e* is aligned with the transmission rod 7 and accommodates the latter in a rotation-resistant manner.

A spring hanger 50*f* which is formed axially straight through in the bottom 50*ab* of the stop module 50 is arranged eccentrically to the central opening 50*e*. The second spring end 54*c* of the return spring 54 is inserted (and therefore fastened) in said spring hanger 50*f*. The transition region 50*g* between the hole in the spring hanger 50*f* and the bottom 50*ab* of the stop module 50 is rounded.

Formed in the cylindrical wall 50*aa* of the stop module 50 are a plurality of grooves 50*n*—of which there are four in the present case—which extend in the axial direction and at one end open out to the bottom 50*ab* of the stop module 50. In the present case, one groove 50*n* in each case aligns with one of the stops 50*b* in each case. In the circumferential direction between the grooves 50*n*, a plurality of locking lugs 50*r*—of which there are four in the present case—are formed on the cylindrical wall 50*aa* of the stop module 50. The locking lugs 50*r* have a flank which rises from the bottom 50*ab* of the stop module 50 and, adjoining said flank, a radially inwardly projecting flank.

The hand lever 5 preferably consists of plastic and is preferably formed as a one-part component. The hand lever 5 has (as a sub-section) a holder into which the stop module 50 is inserted (in the axial direction) when fitting on the hand lever 5. The holder then accommodates the largest part of the stop module 50. The holder is delimited by a wall on which are formed a plurality of ribs—of which there are four in the present case—which extend in the axial direction. The ribs are inserted (in a form-fitting manner) into the grooves 50*n* when fitting the hand lever 5 onto the stop module 50. The hand lever 5 and the stop module 50 are consequently interconnected in a rotation-resistant manner in the circumferential direction so that a transmission of torque is possible. As an option, (additional) axial protrusions are formed on the hand lever 5 and recesses are formed on the stop module 50, for example radially between the central opening 50*e* and the spring hanger 50*f*, which additionally create a form fit between the hand lever 5 and the stop module 50.

A plurality of locking openings—of which there are four in the present case—which are straight through in the radial direction, are additionally formed in the wall of the hand lever 5. When fitting the hand lever 5 onto the stop module 50, the locking lugs 50*r* find their way into the locking openings, forming a clip-in connection, i.e. the edge of each locking opening, which leads in the direction of fitting, fits behind the associated locking lug 50*r*. The hand lever 5 is consequently secured on the stop module 50 in the axial direction.

Figure 7:
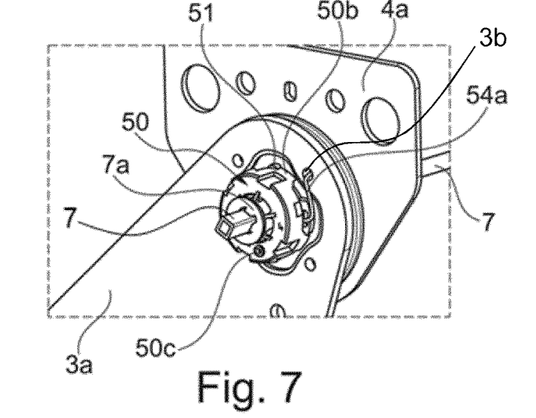
FIG. 7 is a view corresponding to FIG. 6 with securing disk of the transmission rod.

A securing disk 7*a*, which is designed as a rapid fastener which is known per se, secures the transmission rod 7—in addition to the rotation-resistant connection in the circumferential direction—on the stop module 50 in the axial direction. The transmission rod 7 is thereby secured against displacement into the fitting 10, i.e. into the driver 21. The hand lever 5, with which the transmission rod 7 comes into contact in the axial direction, also prevents the displacement of the transmission rod 7 from the fitting 10.

The stop module 50 is consequently functionally connected on the one hand to the hand lever 5 and on the other hand is functionally connected to the transmission rod 7, and as a rule is located in series between these two components. The stop module 50 brings about as a first function the transmission of torque of the operated hand lever 5 to the transmission rod 7 (which transmits the torque to the driver 21 of the two fittings 10) when the hand lever 5 is pivoted in the unlocking direction. The pivoting of the hand lever 5 is carried out against the force of the return spring 54 and is limited by the contact of the stops 50b with the counterstops 51 which are located in the unlocking direction. The stop module 50 brings the hand lever 5 and the fitting 10 into relative abutment in at least one rotational direction.

As a second function, the stop module 50 serves as a safeguard against misuse. If, with the fittings 10 locked, an attempt is made to pivot the hand lever 5 against the unlocking direction, that is to say into the locking direction, then the contact of the stops 50b with the counterstops 51 prevents the stop module 50—and therefore also the transmission rod 7—from rotating.

As a third function, the stop module 50 fulfills a de-rattling function. In the locked state of the two fittings 10, the stop module 50, by means of the return spring 54, is held by its stops 50b in contact with the counterstops 51 of the second fitting part 12 which are located in the locking direction. As a result, the transmission rod 7 is held fast up to a force corresponding to the pretension of the return spring 54, which prevents rattling at least in the event of slight vibrations. If the transmission rod 7 is to remain de-rattled also for larger vibrations, the return spring 54 is to be selected and pretensioned correspondingly strongly. The stop module 50 with the return spring 54 brings the hand lever 5 into a defined end position, which can be seen as a fourth function. In addition, the return spring 54 can also serve for mass compensation of the hand lever 5 in the event of a crash so that the mass inertia of the hand lever 5 does not lead to unlocking of the fitting 10.

The stop module 50 is designed as an identical part and can therefore be used on the left side and on the right side of the vehicle seat 1. The return spring 54 for the left seat side is merely mirror-symmetrical to the return spring 54 for the right seat side. The stop module 50 comprises a first marking 50.4 and a second marking 50.5. In the fitted state on the left seat side, the spring leg 54a is aligned with the first marking 50.4 in the event of a correct pairing of a left return spring 54 with the stop module 50. On the right seat side, the spring leg 54a is aligned with the second marking 50.5 in the event of a correct pairing of a right return spring 54 with the stop module 50. If an incorrect (mirror-symmetrical) return spring is used, the spring leg 54a does not align with the corresponding marking 50.4, 50.5.

A non-locking indication 60 which is known per se and is in the form of a tab placed onto the driver 21 is optionally provided.

The final installation of the fitting system comprises the following steps:

In an optional first step, the non-locking indication 60 is positioned on the driver 21.

In a further step, the return spring 54 (in the previously described arrangement) is prefitted into the stop module 50 and therefore defines a preassembly. The return spring 54 is subsequently tensioned.

In a further step, the preassembly consisting of stop module 50 and pretensioned return spring 54 is clipped to the fastening ring 24 of the driver 21 of the fitting 10. In the process, the first spring end 54b is inserted into the spring holder 3b.

In a further step, the transmission rod 7 is positioned and fitted by the latter being pushed by the driver 21. If provided, the securing disk 7a is then pushed onto the transmission rod 7.

In a final step, the hand lever 5 is positioned and clipped to the stop module 50.

The features disclosed in the above description, the claims and the drawings may be of significance both individually and in combination for realizing the invention in the various configurations thereof.

While specific embodiments of the invention have been shown and described in detail to illustrate the application of the principles of the invention, it will be understood that the invention may be embodied otherwise without departing from such principles.

The invention claimed is:

1. A fitting system for a motor vehicle seat, the fitting system comprising:
at least one fitting comprising a first fitting part and a second fitting part, which are lockable to each other and are rotatable relative to each other about an axis;
a transmission rod, the rotation of which unlocks the fitting;
a hand lever, the actuation of which at least indirectly rotates the transmission rod in order to unlock the fitting;
a stop module which is mounted on the fitting so as to be rotatable about the axis, and is formed separately from the hand lever and on the one hand is functionally connected to the hand lever and on the other hand is functionally connected to the transmission rod, and which brings the hand lever and one of the fitting parts into relative abutment in at least one rotational direction, wherein the stop module has at least one stop and one of the first fitting part and the second fitting part has at least one counterstop, which stop and counterstop interact in the circumferential direction of the axis and define an angular range, within which angular range the stop module is rotatable relative to the one fitting part;
a return spring with a first spring end and a second spring end, wherein the return spring pretensions the stop in the direction of the counterstop in one rotational direction of the stop module; and
a spring holder that is a part of the fitting system or the vehicle seat, wherein one of the two spring ends is fastened to the spring holder of the fitting system or of the vehicle seat and the spring holder is arranged outside the stop module in the radial direction, wherein:
the stop module comprises a right side installation part and a left side installation part, which installs as an identical part on each of a left side of the vehicle seat and a right side of the vehicle seat;
the return spring comprises either a left side return spring for the left side of the vehicle seat or a right side return spring for the right side of the vehicle seat and the left side return spring is configured differently from the right side return spring;
the stop module comprises a first marking which is assigned to and located adjacent to a left spring run region of the left side return spring for the left side of the vehicle seat and a second marking which is assigned to and located adjacent to a right side return spring run region of the right side return spring for the right side of the vehicle seat; and in a correctly fitted and assembled state of the fitting system in the vehicle seat, a spring leg of the return spring runs in the spring run region of the assigned marking.

2. The fitting system as claimed in claim 1, wherein the spring holder is a part of a seat section adapter of the vehicle seat.

3. The fitting system as claimed in claim 1, wherein the stop module comprises a spring hanger for receiving the other of the two spring ends.

4. The fitting system as claimed in claim 3, wherein the spring hanger is designed as a cylindrical opening in the bottom of the stop module.

5. The fitting system as claimed in claim 4, wherein the spring hanger is introduced as a substantially vertical opening into a bottom of the stop module, and a transition region, between the spring hanger and the bottom, is rounded.

6. The fitting system as claimed in claim 1, wherein the stop module has a cup-shaped basic body comprising a cylindrical wall and a bottom.

7. The fitting system as claimed in claim 6, wherein the spring hanger is designed as a cylindrical opening in the bottom of the stop module.

8. The fitting system as claimed in claim 7, wherein the spring hanger is introduced as a substantially vertical opening into the bottom of the stop module, and a transition region between the spring hanger and the bottom is rounded.

9. The fitting system as claimed in claim 1, wherein the return spring for the left side of the vehicle seat is configured mirror-symmetrically with respect to the return spring for the right side of the vehicle seat.

10. The fitting system as claimed in claim 9, wherein the stop module comprises a first marking which is assigned to the return spring for the left side of the vehicle seat and a second marking which is assigned to the return spring for the right side of the vehicle seat, and, in the correctly fitted state of the fitting system in the vehicle seat, a spring leg of the return spring runs in the region of the assigned marking.

11. The fitting system as claimed in claim 1, wherein the first spring end encloses a small angle of 2° to 15°, with a parallel to the axis.

12. The fitting system as claimed in claim 1, wherein the hand lever and the stop module are connected to each other for conjoint rotation in the circumferential direction.

13. The fitting system as claimed in claim 12, wherein at least one groove, which interacts in a form-fitting manner in the circumferential direction with a rib of the hand lever, is formed on the stop module.

14. The fitting system as claimed in claim 1, wherein the hand lever is secured on the stop module in the axial direction.

15. The fitting system as claimed in claim 14, wherein at least one locking lug of the stop module engages in a locking opening in the hand lever forming a clip connection providing security in the axial direction.

16. A vehicle seat comprising:
a fitting system, the fitting system comprising:
at least one fitting comprising a first fitting part and a second fitting part, which are lockable to each other and are rotatable relative to each other about an axis;
a transmission rod, the rotation of which unlocks the fitting;
a hand lever, the actuation of which at least indirectly rotates the transmission rod in order to unlock the fitting;

a stop module which is mounted on the fitting so as to be rotatable about the axis, and is formed separately from the hand lever and on the one hand is functionally connected to the hand lever and on the other hand is functionally connected to the transmission rod, and which brings the hand lever and one of the fitting parts into relative abutment in at least one rotational direction, wherein the stop module has at least one stop and one of the first fitting part and the second fitting part has at least one counterstop, which stop and counterstop interact in the circumferential direction of the axis and define an angular range, within which angular range the stop module is rotatable relative to the one fitting part;

a return spring with a first spring end and a second spring end, wherein the return spring pretensions the stop in the direction of the counterstop in one rotational direction of the stop module; and a spring holder that is a part of the fitting system or the vehicle seat, wherein one of the two spring ends is fastened to the spring holder of the fitting system or of the vehicle seat and the spring holder is arranged outside the stop module in a radial direction, wherein:

the stop module comprises a right side installation part and a left side installation part, which installs as an identical part on each of a left side of the vehicle seat and a right side of the vehicle seat;

the return spring comprises either a left side return spring for the left side of the vehicle seat or a right side return spring for the right side of the vehicle seat and the left side return spring is configured differently from the right side return spring;

the stop module comprises an optically visible first marking which is assigned to and located adjacent to a left spring run region of the left side return spring for the left side of the vehicle seat and an optically visible second marking which is assigned to and located adjacent to a right side return spring run region of the right side return spring for the right side of the vehicle seat; and in a correctly fitted and assembled state of the fitting system in the vehicle seat, a spring leg of the return spring runs in the spring run region of the assigned marking.

17. The vehicle seat as claimed in claim 16, further comprising a seat section adapter wherein the spring holder is a part of the seat section adapter.

18. The fitting system as claimed in claim 16, wherein the stop module comprises a spring hanger for receiving the other of the two spring ends.

19. A fitting system for a motor vehicle seat, the fitting system comprising:
a fitting comprising a first fitting part and a second fitting part, which the first fitting part and the second fitting part being lockable to each other and being rotatable relative to each other about a fitting axis;
a transmission rod, the rotation of which unlocks the fitting;
a hand lever, the actuation of which at least indirectly rotates the transmission rod in order to unlock the fitting;
a stop module mounted on the fitting so as to be rotatable about the fitting axis, the stop module being separate from the hand lever and being both functionally connected to the hand lever and functionally connected to the transmission rod, which brings the hand lever and one of the fitting parts into relative abutment in at least one rotational direction, the stop module comprising a stop and one of the first fitting part and the second fitting part comprising a counterstop, which stop and counterstop interact in a circumferential direction of the fitting axis and define an angular range, within which angular range the stop module is rotatable relative to the one fitting part comprising the counterstop;

a return spring comprising a first spring end and a second spring end; and a spring holder fixed relative to the stop module, wherein the first spring end is fastened to the spring holder and the second spring end is fastened to the stop module wherein the return spring pretensions the stop of the stop module in a direction of the counterstop in one rotational direction of the stop module and the spring holder is arranged radially outwardly of a radial outward peripheral surface of the stop module and the spring has an outward run extent from a spring basic body within the stop module, located inwardly of the radial outward peripheral surface, to the spring holder, wherein:

the stop module comprises a right side installation part and a left side installation part, which stop module installs as an identical part on each of a left side of the vehicle seat and a right side of the vehicle seat;

the return spring comprises either a left side return spring for the left side of the vehicle seat or a right side return spring for the right side of the vehicle seat and the left side return spring is configured differently from the right side return spring; and the stop module further comprises an optically visible first marking which is assigned to and located adjacent to a left spring run region of the left side return spring for the left side of the vehicle seat and an optically visible second marking which is assigned to and located adjacent to a right side return spring run region of the right side return spring for the right side of the vehicle seat, with the outward run extent of the return spring being aligned with and adjacent to the first marking with the return spring comprising the left side return spring and the outward run extent of the return spring being aligned with and adjacent to the second marking with the return spring comprising the right side return spring.

20. The fitting system as claimed in claim 19, wherein:

the stop module comprises a spring hanger for receiving the second spring end; and the spring hanger is configured as a cylindrical opening in a wall of the stop module.

* * * * *